United States Patent

[11] 3,620,459

| [72] | Inventor | Cornelis van der Lely<br>7, Bruschenrain, Zug, Switzerland |
|---|---|---|
| [21] | Appl. No. | 825,502 |
| [22] | Filed | May 19, 1969 |
| [45] | Patented | Nov. 16, 1971 |
| [32] | Priority | May 20, 1968 |
| [33] | | Netherlands |
| [31] | | 6807096 |

[54] SPREADING IMPLEMENT WITH STABILIZED SUPPORT FRAME
8 Claims, 3 Drawing Figs.

[52] U.S. Cl....................................................... 239/670, 239/675
[51] Int. Cl....................................................... A01c 19/00
[50] Field of Search........................................ 239/661, 664, 670, 675, 687, 679, 681–685, 672, 673; 222/176

[56] References Cited
UNITED STATES PATENTS

| 3,159,296 | 12/1964 | Schuitemaker............... | 239/664 X |
| 3,218,083 | 11/1965 | van der Lely et al.......... | 239/675 |
| 3,441,224 | 4/1969 | Cotter et al................... | 239/687 X |
| 3,478,970 | 11/1969 | Siwersson et al. ............ | 239/687 |
| 3,507,452 | 4/1970 | Dreyer ......................... | 239/679 X |
| 789,254 | 5/1905 | Campbell...................... | 239/676 X |
| 2,525,546 | 10/1950 | Harris............................ | 239/664 |

Primary Examiner—M. Henson Wood, Jr.
Assistant Examiner—John J. Love
Attorney—Mason, Mason & Albright

ABSTRACT: A spreader implement with an elongated container mounted on a frame is supported on three support points in the form of two rear, spaced-apart ground wheels and a pair of closely adjacent front ground wheels. As seen in plan, all of the wheels are located beneath the container to insure stability when the container is fully loaded.

INVENTOR
CORNELIS VAN DER LELY

INVENTOR
CORNELIS VAN DER LELY

SPREADING IMPLEMENT WITH STABILIZED SUPPORT FRAME

According to the invention, there is provided an implement of the kind set forth, wherein the frame is supported on the ground at three relatively spaced points which are all located within the boundaries of the container when the implement is viewed in plan.

Figure 1:
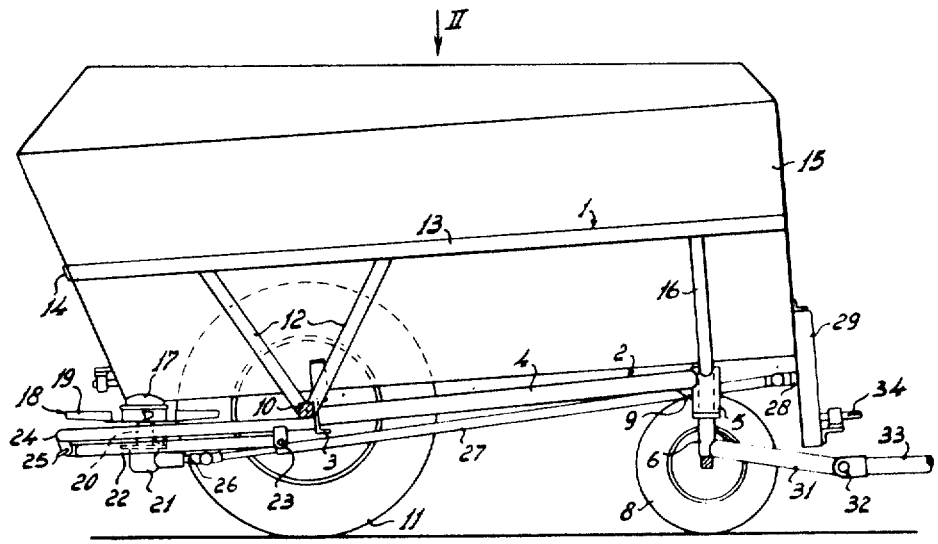
Figure 3:
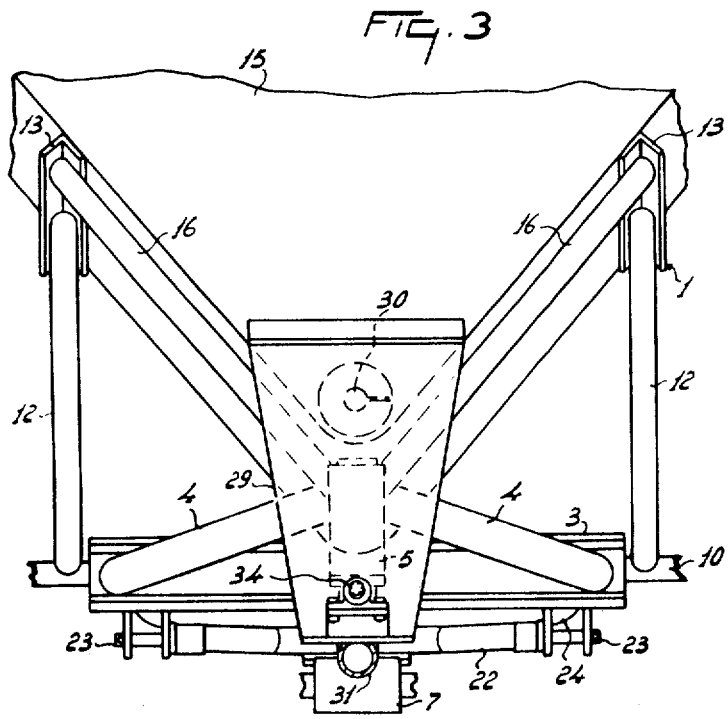
Figure 2:
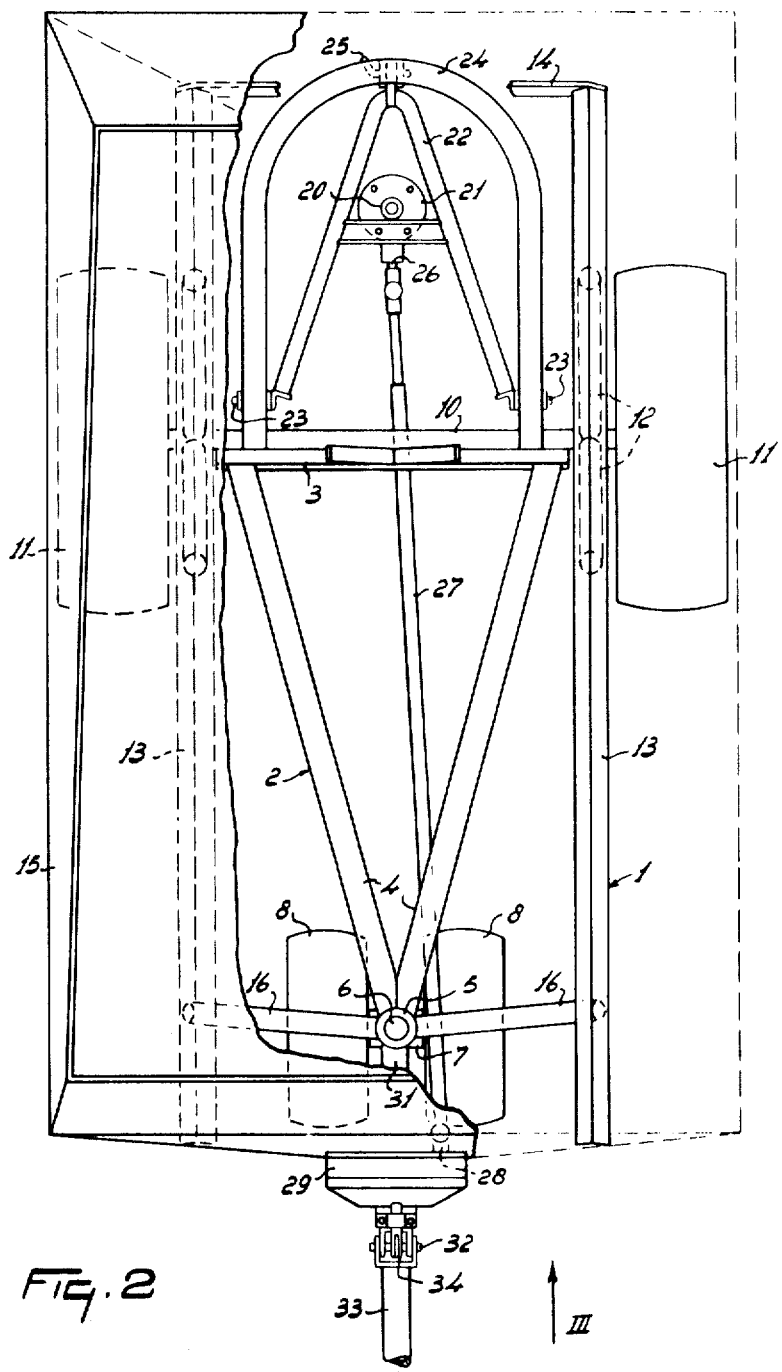

For a better understanding of the invention, and to show how the same may be carried into effect, reference will now be made, by way of example, to the accompanying drawings, in which:

FIG. 1 is a side elevation of a spreading implement in accordance with the invention, FIG. 2 is a plan view, to an enlarged scale, as seen in the direction indicated by the arrow II in FIG. 1, a hopper of the implement being shown broken away to a large extent, and FIG. 3 is a partial front elevation as seen in the direction indicated by the arrow III in FIG. 2.

Referring to the drawings, the spreading implement which is illustrated is intended primarily for the distribution of granular or powdered materials such, purely for example, as artificial fertilizers, lime, sand, seeds and the like. The implement has a frame which is generally indicated by the reference 1, said frame including a triangular part 2 which includes a beam 3 of channel-shaped cross section disposed substantially horizontally perpendicular to the intended direction of travel of the implement. The beam 3 affords the base of the triangular part 2, the other two sides of the isosceles triangle being afforded by two beams 4 which converge forwardly from the beam 3 with respect to the intended direction of operative travel of the implement. The leading ends of the two beams 4 are interconnected and a substantially vertical bearing 5 is mounted at the junction point and has a substantially vertical shaft 6 turnably mounted therein. The lowermost end of the shaft 6 carries a short horizontal shaft 7 at the opposite ends of which two ground wheels 8 are rotatably mounted so as to lie at opposite sides of the shaft 6. A reinforcing plate 9 is provided to strengthen the junction between the bearing 5 and the interconnected leading ends of the two beams 4.

An axle beam 10 is rigidly secured to the rear side of the beam 3 and is provided at its opposite ends with two large rotatably mounted ground wheels 11. Two pairs of beams 12 are provided, each pair being arranged adjacent a corresponding end of the axle beam 10 in approximately V-shaped relationship with the lowermost point of the V coincident with the axle beam 10. The upper ends of each pair of beams 12 are interconnected by a corresponding longitudinal beam 13 of inverted V-shaped configuration, the rearmost ends of the two beams 13 being rigidly interconnected by a flat horizontally extending beam 14. A material container in the form of a hopper 15 is supported by the beams 13 and 14, said hopper 15 being elongated lengthwise of the implement and having a generally V-shaped or funnel-shaped cross section (see FIG. 3). The hopper 15 is further supported, adjacent its leading end, by two beams 16 that are arranged in approximately V-shaped relationship with their upper ends fastened to the corresponding beams 13 and their lowermost ends fastened to opposite sides of the top of the bearing 5.

A cylindrical outlet port 17 is provided at the rearmost end of the floor of the hopper 15 which floor, as will be seen from FIG. 1 of the drawings, is gently inclined to the horizontal so as to extend downwardly from the front of the hopper to the rear thereof. The outlet port 17 is in communication with an underlying rotary-spreading member 18 which is afforded principally by a bladed ejector disc 19 that is rotatable about a substantially vertical axis afforded by a shaft 20 to the uppermost end of which said disc 19 is fastened. The lowermost end of the substantially vertical shaft 20 is rotatably mounted in a gearbox 21 that is supported by a bracket 22. The bracket 22 is pivotally connected by substantially horizontally aligned pins 23 that are located near the axle beam 10 to a further bracket 24 which is rigidly secured to the rear side of the beam 3. The bracket 22 is generally U-shaped and its base carries a lug which is releasably connected by a locking pin 25 to at least one further lug carried by the base of the somewhat similarly shaped bracket 24.

The openings by which the outlet port 17 communicates with the spreading member 18 are provided with a flow control or dosing member by which the volume of material per unit time that reaches the spreading member 18 from the hopper 15 can be controlled and also by which, preferably, the general direction of ejection of the material from the spreading member 18 can be controlled during the operation of the implement. The construction and arrangement of the flow control or dosing member is not relevant to the present invention and said member and its controls have therefore not been shown fully in the drawings and will not be further described. The gearbox 21 has a forwardly projecting input shaft 26 which is connected by a universal joint to the rear end of a telescopic shaft 27 which is arranged to transmit rotation by way of a further universal joint from the outlet shaft 28 of a transmission casing 29 which is fastened to the front of the hopper 15. The construction and arrangement of the transmission which is contained within the casing 29 is not relevant to the present invention and it need only be pointed out that the transmission has a rotary input shaft 34 which projects forwardly from the front of the casing 29 for connection to the power takeoff shaft of a towing tractor or other vehicle by way of a telescopic transmission shaft of known construction having universal joints at its opposite ends. A screw conveyor 30 extends lengthwise of the interior of the hopper 15 immediately above the bottom thereof and, during operation of the implement, is driven at slow speed by the transmission contained within the casing 29 to ensure a uniform and continuous delivery of the material to the outlet port 17 and to tend to prevent caking, bridging or other forms of clogging of the material within the hopper 15. It is preferred that the transmission casing 29 should include an infinitely variable change speed gear so that the speed of operation of the screw conveyor 30 can be governed in accordance with the nature and condition of the material which is to be spread by the implement.

A drawbar 31 projects forwardly from the lowermost end of the shaft 6 and the leading end of said drawbar, which is located beneath the transmission casing 29, carries a horizontal pivot pin 32 affording a connection between the drawbar and a drawbar extension 33 whose leading end (not shown) is forked or otherwise adapted for coupling to the tow bar or hitch of an agricultural tractor or other vehicle. It will be noted from FIG. 2 of the drawings that, when the implement is seen in plan view, the pivot pin 32 is located a little in front of the leading wall of the hopper 15.

The implement is, in effect, supported on the ground at three relatively spaced points, these points being the regions of contact of the two large ground wheels 11 with the ground and the region of contact of the twin closely neighboring ground wheels 8 with the ground. All three of these points are located beneath the hopper 15 when the implement is seen in plan view (FIG. 2) and the construction is such that the implement is very stable and such that the frame is not overloaded even when the hopper 15 is completely filled. The closely neighboring relationship of the twin ground wheels 8 ensures stability even when the implement is negotiating steep bends since the region of contact between said ground wheels 8 and the ground surface is very little changed in position at such times as compared with straight line travel.

Having thus described my invention, what I claim as new and desire to secure by Letters Patent of the United States is:

1. A spreading implement comprising a movable frame and an elongated V-shaped container supported on said frame, said container having an outlet and a rotatable spreading member positioned below said outlet, said implement being supported on the ground at three relatively spaced supporting points, said supporting points being located directly beneath said implement and within the area defined by the outline of said container when seen in plan view, two of said supporting points being ground wheels located adjacent the rear of said implement and the third supporting point comprising two side-by-side relatively smaller wheels located near the front thereof, said two side-by-side front wheels being angularly displaceable about a vertical shaft which extends between said two wheels, said frame of the implement being triangular in shape and said shaft being turnably mounted at the figurative apex of said triangle with the base thereof extending substantially parallel and adjacent to a rear axle beam having the rear ground wheels mounted thereon, strut means supporting said container and said strut means including a pair of upstanding struts which extend upwardly from said shaft along the sides of said container.

2. A spreading implement comprising a movable frame and an elongated container supported on said frame, said container having an outlet and a rotatable spreading member positioned below said outlet, said implement being supported on the ground at three relatively spaced supporting points, said supporting points being located directly beneath said implement and within the area defined by the outline of said container when seen in plan view, two of said supporting points being ground wheels located adjacent the rear of said implement and the third supporting point comprises two side-by-side front wheels being angularly displaceable about a vertical shaft which extends between said two wheels, a drawbar being connected to said shaft and extending forwardly of the implement whereby said implement can be towed, said container being V-shaped in cross section with a relatively narrow bottom which extends down adjacent said rear axle beam.

3. A spreading implement comprising a movable frame and an elongated container supported on said frame, said container having an outlet and a rotatable spreading member positioned below said outlet, said implement being supported on the ground at three relatively spaced supporting points, said supporting points being located directly beneath said implement and within the area defined by the outline of said container when seen in plan view, said outlet being located adjacent the rear end of said container and transmission means including a gearbox for driving said spreading member being located at the front end of said container, said transmission means comprising a driving shaft which extends lengthwise of said implement below and to one side of the longitudinal ends of said container from said spreading member to one side of said gearbox and a coupling part located at the front of said implement relative to the direction of travel, said coupling part being connectable in driven connection with the power takeoff shaft of a prime mover, a tow bar connected to said frame to extend forwardly beneath said coupling part and said gearbox.

4. A spreading implement comprising a movable frame and an elongated container supported on said frame, said container having an outlet and a rotatable spreading member positioned below said outlet, said container being generally V-shaped and positioned to slope from the front to the rear of said implement, a driving shaft extending from the front of said implement to the spreading member below said container, ground wheel means supporting the front of said implement and positioned centrally below said container, relatively large ground wheels located on each side of said frame at the rear of said implement on a common axle, said frame comprising a triangular horizontal portion in which said ground wheel means is mounted at the apex thereof and said large ground wheels are mounted adjacent the figurative base thereof, said container being V-shaped in cross section with a relatively narrow bottom which extends down adjacent said rear axle beam, said driving shaft being located above the front ground wheel means to extend downwardly below said axle at the rear of said container.

5. An implement as claimed in claim 1, wherein a drawbar is connected to said shaft.

6. An implement as claimed in claim 5, wherein said drawbar has an extension whereby said bar is turnable relative to a substantially horizontal axis.

7. An implement as claimed in claim 6, wherein said substantially horizontal axis is located in front of said container relative to the direction of travel.

8. An implement as claimed in claim 1, wherein the corner of said triangular frame at which said substantially vertical shaft is located, is positioned at a higher level than the figurative base of said triangular part.

* * * * *